United States Patent [19]

Young, Jr.

[11] 4,303,924

[45] Dec. 1, 1981

[54] JET DROP PRINTING PROCESS UTILIZING A RADIATION CURABLE INK

[75] Inventor: Ainslie T. Young, Jr., Chillicothe, Ohio

[73] Assignee: The Mead Corporation, Dayton, Ohio

[21] Appl. No.: 973,120

[22] Filed: Dec. 26, 1978

[51] Int. Cl.³ ............................................. G01D 15/18
[52] U.S. Cl. ..................................... 346/1.1; 106/22; 346/75; 346/140 R; 427/54.1
[58] Field of Search .................. 346/1, 75, 140 R; 106/20, 22, 30; 427/54.1

[56] References Cited

U.S. PATENT DOCUMENTS

| | | | |
|---|---|---|---|
| 3,298,030 | 1/1967 | Lewis | 346/75 |
| 3,705,043 | 12/1972 | Zabiak | 106/20 |
| 3,781,214 | 12/1973 | Nemoto | 106/20 X |
| 3,803,109 | 4/1974 | Nemoto | 106/20 X |
| 3,804,736 | 4/1974 | Pasternack | 106/22 X |
| 3,856,744 | 12/1974 | Radlove | 106/20 X |
| 3,870,528 | 3/1975 | Edds | 106/22 |
| 4,003,312 | 1/1977 | Gunther | 346/75 |
| 4,026,939 | 5/1977 | Weiss | 106/20 X |
| 4,056,453 | 11/1977 | Barzynski | 204/159.23 |
| 4,070,322 | 1/1978 | Hwang | 106/22 X |
| 4,137,138 | 1/1979 | Batt | 106/20 X |
| 4,142,905 | 3/1979 | Cooke | 106/22 |
| 4,155,895 | 5/1979 | Rohowetz | 106/22 X |
| 4,228,438 | 10/1980 | Vazirani | 346/1.1 |

*Primary Examiner*—Joseph W. Hartary
*Attorney, Agent, or Firm*—Biebel, French & Nauman

[57] ABSTRACT

A jet drop printing process utilizing a radiation (UV, electron beam, etc.) curable ink composition. The ink composition includes a low molecular weight multifunctional ethylenically unsaturated material, a low molecular weight monofunctional ethylenically unsaturated material, a reactive synergist, a dye colorant, and an oil soluble salt. A small amount of organic polar solvent and stabilizer may also be included. In addition, when a UV cure is used, a photoinitiator is also added to the mixture. In order to function properly in the jet drop printing process, the ink composition should have a viscosity of less than about 15 centipoise, a resistivity of around 50–5000 ohm-cm, and a surface tension of approximately 20–70 dynes/cm.

3 Claims, 1 Drawing Figure

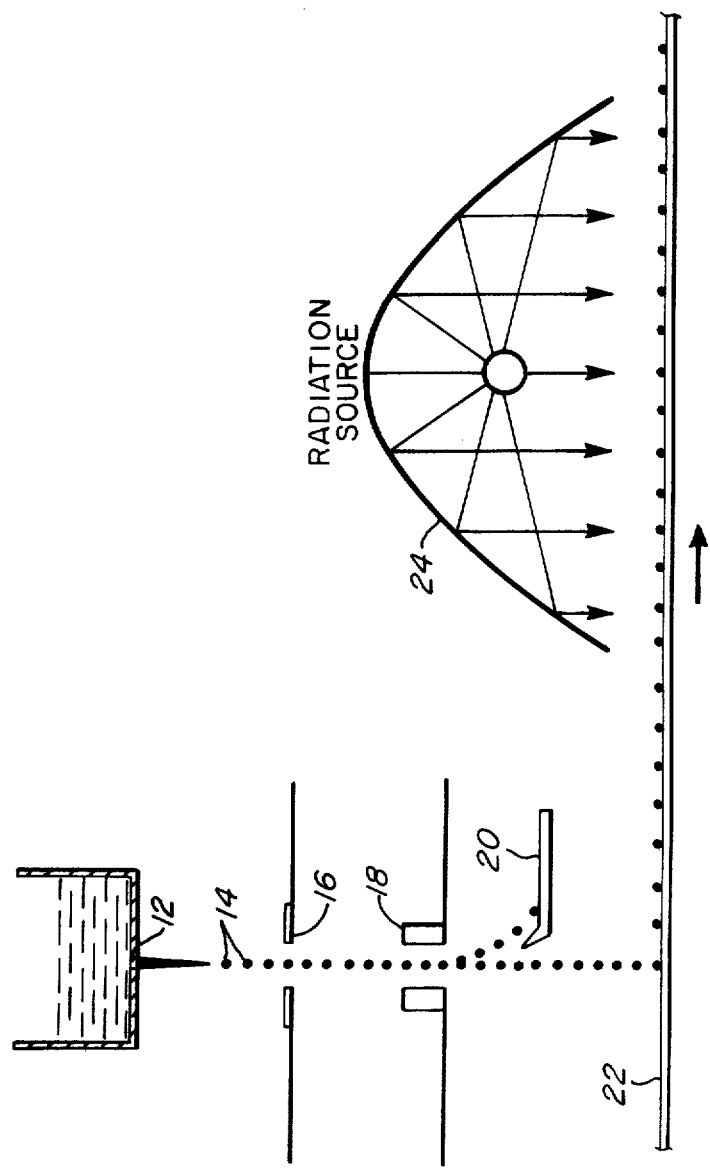

4,303,924

JET DROP PRINTING PROCESS UTILIZING A RADIATION CURABLE INK

BACKGROUND OF THE INVENTION

This invention relates to a jet drop printing process and printing inks therefor and more particularly to radiation curable printing inks suitable for use in jet drop printers of the type disclosed in Lyon et al. U.S. Pat. No. 3,739,393; Brady et al., U.S. Pat. No. 3,805,273; Stoneburner U.S. Pat. No. 3,891,121; and Stoneburner U.S. Pat. No. 4,080,608. Such printers print on a high-speed moving web by selective charging and catching of drops generated at a frequency in the order of about 50 Khz by each of the streams flowing from 500 or more orifices. In the case of high speed printing, discrete droplets of ink must be formed at the rate of between ten thousand and one million droplets per second, each possessing essentially the same color characteristics for a given color. Usually, the drops range in size from 2 to 3 mil droplets to give deposited droplets of 3 to 5 mils in diameter, when generated through an orifice of less than about 2 mils in diameter.

As can be imagined, the inks which find utility in such jet drop printers must have a number of special characteristics. Typically, water-based inks have been used because of their conductivity and viscosity range. Thus, for use in a jet drop printer the ink must be electrically conductive, having a resistivity below about 5000 ohm-cm and preferably below about 500 ohm-cm. For good runability through small orifices water-based inks generally have a viscosity in the range between about 1 to 15 centipoise at 25° C.

Over and above this, the ink must be stable over a long period of time, compatible with the materials comprising the orifice plate and ink manifold, free of living organisms, and functional after printing. The required functional characteristics after printing are: sufficient light absorptivity at infrared wave lengths, smear resistance after printing, fast drying on paper, and waterproof when dry.

Examples of different types of water-based jet drop printing inks are found in U.S. Pat. Nos. 3,903,034; 3,889,269; 3,870,528; 3,846,141; 3,776,642; and 3,705,043. Several of these patents address individual problems inherent in use of water-based inks in jet drop printers. Thus, Sanders U.S. Pat. No. 3,776,742 utilizes a special formulation to provide an non-cockling feature and Ostergren U.S. Pat. No. 3,846,141 discloses use of a hermectant to prevent clogging of the nozzles through drying. Even, then, it can be said that no water-based ink has been developed which has fully satisfactory smudge resistance, drying and waterproof characteristics.

Thus, water-based inks in general can be said to have the following disadvantages:

(1) They require water evaporation in the drying stage, necessitating extensive drying systems which utilizes large amounts of energy (2) Large printed areas of paper substrates usually cockle because of the amount of water present.

(3) The dried images are sensitive to wet and dry rub.

(4) The compositions usually have to be formulated to include an anti-bacterial perservative when extended periods of storage are anticipated in order to prevent or minimize the growth of bacteria in the compositions.

(5) Inks of low viscosity have a tendency to tip dry on the orifice without the use of humectants, but the addition of humectants to prevent tip drying usually results in an increase in viscosity.

Of course, it is possible to solve some of the problems, such as absorbency and waterproof characteristics, by use of polar organic solvent-based inks. U.S. Pat. Nos. 3,994,736 to Hertz and 4,070,322 to Hwang disclose the use of polar organic solvent-based inks; and Nos. 4,021,252 to Banczak and 4,024,096 to Eztchel disclose use of alcohol-water solvent systems.

Still, many of the problems remain. In addition, use of organic solvents requires that precautions be taken against any toxic or flammable vapors which may be emitted. When the solvent content is high, this can be a particular problem in the vicinity of the drop generating orifice or orifices, and even removal of the volatile materials from the printed surface requires the use of bulky, elaborate drying systems. Because these problems are so serious, most prefer using water-based inks despite the number of disadvantages listed above. Accordingly, the need exists for a jet printing ink which has as few of these disadvantages as possible.

That need is met by the use of radiation curable inks of the type described herein. Of course, radiation-curable inks per se are known in the art. See, for example, U.S. Pat. Nos. 4,056,453; 4,026,949; 3,804,736; and 3,803,109. But, none of these mention using radiation-curable inks in jet drop printers. To my knowledge, that has not previously been suggested. In addition, the unique ink formulations of the present invention are particularly suited to use in jet drop printers.

SUMMARY OF THE INVENTION

The present invention satisfies the need for a low solvent content jet printing ink by use of radiation curable compositions especially adapted for use in jet drop printers. By radiation curable it is meant any radiation polymerizable monomer or prepolymer or mixture of monomers or prepolymers which will cure upon irradiation. The types of irradiation which may be used include ultraviolet, x-ray, gamma ray, or electron beam radiation energy. Thus, the major component (preferrably 5–80% by weight) of the inks of the present invention is a low molecular weight multifunctional ethylenically unsaturated radiation polymerizable material. Preferred are photo-polymerizable materials which may be cured in the presence of a photoinitiator by irradiation with an ultraviolet light source.

Among the radiation curable materials which may be used are the polyfunctional terminally unsaturated organic compounds including the polyesters of ethylenically unsaturated acids such as acrylic acid and methacrylic acid and a polyhydric alcohol. Examples of some of these polyfunctional compounds are the polyacrylates and polymethacrylates of trimethylolpropane, pentaerythritol, dipentaerythritol, ethylene glycol, triethylene glycol, propylene glycol, glycerin, sorbitol, neopentylglycol, 1,6-hexanediol and hydroxy-terminated polyesters, hydroxy-terminated epoxy resins, and hydroxy-terminated polyurethanes. Also included in this group of terminally unsaturated organic compounds are polyallyl and polyvinyl compounds such as diallyl phthalate and tetraallyloxyethane and divinyl adipate, butane divinyl ether and divinylbenzene.

A less preferred group of radiation curable compounds are polyfunctional ethylenically unsaturated compounds that are not terminally unsaturated, but these materials tend to be less reactive than the terminally unsaturated compounds.

In addition to the multifunctional ethylenically unsaturated material, a monofunctional one may also be used. Thus, 0–90% by weight of a monofunctional ethylenically unsaturated material may be added for viscosity control, cured film flexiblity and bond strength. A preferred group of such radiation curable compounds are the terminally unsaturated organic compounds containing one terminal ethylenic group per molecule. Examples of such monofunctional compounds are the $C_2$ to $C_{16}$ alcohol esters of acrylic and methacrylic acid, styrene and substituted styrenes, vinyl esters such as vinyl acetate, vinyl ethers and N-vinyl-2-pyrrolidone. In general, these compounds are liquid and have lower viscosity than the polyfunctional compounds and thus can be used to reduce the viscosity of the coating composition.

A third ingredient of the ink composition of the present invention is 0–15% of a reactive synergist. Reactive synergists are added to the formulations in order to enhance the photoreactive properties of certain photoinitiators and to enhance the reactivity of the ethylenically unsaturated monomers in the system. For example, a preferred class of reactive synergists which have been found to enhance the photoreactivity of such photoinitiators as benzophenone and Michler's Ketone are the alkanolamines such as demethylethanolamine, methyldiethanolamine and triethanolamine. N-vinyl-2-pyrrolidone is an example of the preferred class of reactive synergists for acrylic monomers. It can also be considered a monofunctional ethylenically unsaturated material, and so can serve a dual purpose in the ink composition mixture.

Another essential ingredient of the composition of the present invention is a dye colorant which does not interfer with the curing efficiency of the ink. It may be present in an amount of approximately 0.2–10% by weight and may be any of a broad class of solvent soluble dyes which may be used to impart tinctorial strength to the ink system. Useable commercial solvent dyes can be drawn from a number of chemical groups. For example, the azo dyes predominate the yellow, orange, brown and red hues wherein the violet dyes may come from any of the azo, anthraquinone, xanthene or triarylmethane group containing compounds. Blue and green hued solvent dyes are predominantly of the anthraquinone and triarylmethane groups although it is also possible to use dyes selected from the azine, thiazine and phthalocyanine groups. Black hued solvent dyes acceptable in this invention come from the very important azine dye system Nigrosine although there are other azo dyes which can be used.

The solubility properties of the dye in the radiation curable material is very important in imparting proper tinctorial strength. Naturally such solubility properties are a function of the chemical constitution associated with each dye but it has generally been found that whether the form of the dye is acid, base, or neutral, most solvent dyes are soluble in systems described herein.

The final major component (0.5–15%) of the ink composition is an oil soluble salt to impart conductivity to the ink. The types of compounds which may be used as the oil soluble salt are the mineral acid and organic acid quaternary salts of the Group I-a elements. Examples are N, N-cetyl ethyl morpholinium ethosulfate, coco imidazoline benzyl chloride quaternary, ethyl triphenyl-phosphonium acetate and disteryl dimethyl ammonium chloride.

These main ingredients are combined to form a jet printing ink which has high light absorptivity at infrared wave lengths and is smear resistant and waterproof after setting. Preferrably, it has a viscosity of less than about 15 centipoise, a resistivity of around 50–5000 ohm-cm, and a surface tension of approximately 20–70 dynes/cm.

Of course, other ingredients may also be used in the ink composition. In fact, in the preferred form of UV curing material, from 0.2–20% of a photoinitiator is generally required. The preferred photoinitiators for this invention include those which, upon absorption of a quantum of ultraviolet light radiation, yield free radical decomposition products. Such free radical decomposition products intitiate the polymerization process of the ethylenically unsaturated compounds. A wide variety of photoinitiators are availabe which serve well in the system described in this invention. The preferred photoinitiators are the benzoin alkyl ethers such as Vicure 30 (a mixture of alkyl benzoin ethers manufactured and sold by Stauffer Chemical Co., Westport, Connecticut), benzoin butyl ether, benzoin methyl ether and the like, $\alpha$, $\alpha$-diethoxyacetophenone and 2,2-dimethoxy-2-phenylacetophenone. Other photoinitiators which have been used are benzophenone, Michler's Ketone (4,4'-bis(dimethylamino)-benzophenone), xanthane, thioxanthane, $\alpha$, $\alpha$-azobisisobutylnitrile, decabromodiphenyloxide, pentabromomonochlorocyclohexane, pentachlorobenzene, polychlorinated biphenyls, 2-ethylanthraquinone, 1-(chloroethyl)naphthalene, desyl chloride, chlorendic anhydride, naphthalene sulfinyl chloride, 2-bromoethyl ether and the like or any combination thereof.

Other possible ingredients include an organic polar solvent (0–30%) and a small amount (1–400 ppm) of a stabilizer.

The preferred group of optional polar solvents can be selected from any of the low viscosity solvents commerically available. This group would include low molecular weight aliphatic alcohol such as methanol and ethanol, polar ketones and ethers such as acetone and dioxane and other high dielectric low molecular weight solvents such as dimethylsulfoxide, mesityl oxide, dimethyl formamide or thiophene. The organic polar solvent is used for viscosity control and should, therefore, be compatible with the radiation curable mixture.

The preferred stabilizers are any of a variety of anti-oxidant stabilizers used as free radical scavengers to stabilize unsaturated monomers. Some examples include the well-known compounds of the general classes of phenols, thiols and amines such as p-hydroxyanisole, hydroquinone, xanthates and N-alkyl or N-aryl anilines.

The use of an ink composition having the listed ingredients offers a number of unique advantages in a jet drop printing operation. Those ingredients are especially designed to fit the rheological properties of a jet printing ink, including the requirements for low viscosity and high conductivity.

Since the radiation curable jet printing ink of the present invention is composed of essentially non-volatile components, there is no need for the addition of humectants to prevent tip drying. Ink degradation due to bacterial growth is also non-existent in this system. Likewise, the problem of evaporation of solvent in conventional jet printing ink systems during recirculation in the printer is greatly reduced, although it is desirable to use a vapor exhaust system, especially when an organic polar solvent is used to control viscosity.

However, since ultraviolet and electron beam radiation equipment are less bulky and less expensive to operate than conventional solvent drying equipment, the use of a radiation curable ink of the type disclosed results in a more compact, more energy-efficient operation than a comparable conventional system. For example, it takes about 20% as much energy to cure a UV ink as it does to dry a conventional aqueous-based ink.

On the other hand, UV-curable printing inks in general do not contain dye colorants because most dye colorants interfere with the curing efficiency of the system. Efficiency of curing is defined as the rate at which the material sets to a hard, tack and smudge-free state. In a UV-curable formulation, it is very important to have an extremely high curing activity in the presence of an ultraviolet light source. As a result, a smaller number of high output UV lamps, for example medium pressure lamps with a specific output of 200 watts per linear inch per lamp, can be used to cure the ink. Since pigment coloring materials, are undesirable in a jet printing ink, a significant advantage to one embodiment of the present invention is the unique combination of photoinitiator and dye class which does not interfere with the curing efficiency of the system.

Accordingly, it is an object of the present invention to provide a jet printing ink which has high light absorptivity at infrared wave lengths, is smear resistant and waterproof after settling, and is radiation curable.

Another object of the present invention is to provide a jet drop printing process utilizing a radiation curable ink having the advantages enumerated.

Other advantages of the invention will be apparent from the following description, the accompanying drawing, and the appended claims.

BRIEF DESCRIPTION OF THE DRAWING

The FIGURE is a schematic diagram of a jet drop printing process utilizing the radiation curable inks of the present invention.

DESCRIPTION OF THE PREFERRED EMBODIMENT

Referring to the FIGURE there is shown a very basic schematic arrangement for the jet drop printing process of the present invention. More detail as to the apparatus and method features of jet drop printing in general can be found in the following illustrative patents assigned to the assignee of the present invention: U.S. Pat. Nos. 3,739,393; 3,805,273; 3,891,121; and 4,080,608. Basically, that process involves, as illustrated in the FIGURE with a single orifice (although multiple ones are used), ink issuing from an orifice 12 at high speed. This stream of ink tends to break into droplets 14 according to basic physical laws.

By vibrating the orifice ultrasonically, the breakup is so well controlled that it always occurs within a charging electrode or charge ring 16, which is about 0.025 inch long. If a potential exists on charge ring 16 when the droplet separates from the stream, the droplet is charged by induction. Preferrably, the potential on the charge ring 16 is either zero or approximately 100 V; although, other variations in the charge level may be used.

When the potential is 100 V, the droplets are charged when they separate. When the potential is zero, the droplets are not charged. If other charge levels are used, a differential should exist sufficient to permit selective deflection. After the droplets have been tagged with either the absence or presence of charge, they pass through a very strong electrostatic field produced by deflection plate 18. The charged drops are deflected, caught in catch pan 20, and not printed upon the paper 22. If they are not charged, they are not affected by the electrostatic field and pass straight through undeflected to print on the paper 22. The philosophy of having the noncharged droplets print in the preferred embodiment is that it minimizes the static-electricity effects associated with moving paper.

Once on paper 22, the inked images are brought under radiation source 24 in order to cure the radiation curable ink. As mentioned previously, that radiation source may be ultraviolet, x-ray, gamma ray, or electron beam radiation; although, ultraviolet radiation is preferred. The hooded portion of radiation source 24 may also be used to exhaust any vapors driven off during the cure. Exhaust lines (not shown) would be used for that purpose. Likewise, the hooded arrangement allows for use of an inert atmosphere during the curing, if it is so desired.

Using an arrangement as shown in the FIGURE, various radiation curable jet drop printing ink formulations were used in accordance with the present invention. The examples below list representative formulations of the types usable.

Example I

A jet printing ink is prepared by blending at room temperature the following ingredients (percent by weight composition)—
  41% Trimethyolpropane Triacrylate
  37% Neopentyl Glycol Diacrylate
  10% Ethyl Alcohol (95%)
  7% N-Vinyl-2-Pyrrolidone
  4% Alkyl Benzoin Ether
  1% DuPont Oil Blue A
  200 ppm 4-Methoxyphenol The viscosity of this ink is 12 cps at 20° C., it has a conductivity of 350 microhm/cm. (a resistivity of 2850 ohm-cm) and a surface tension of 33 dynes/cm., and a one mil film will cure under a nitrogen atmosphere at 70 ft/minute when exposed to one 200 watt/linear inch medium pressure mercury lamp.

The ink was then placed in a reservoir under a pressure of 11.5 psi and pushed through an orifice 0.002 inch in diameter to form a stream of droplets. The stream of droplets was then passed through a charging ring and impinged on a moving paper substrate to give discrete spots on the substrate.

Passing the sheet under a 200 watt/linear inch UV lamp at 70 feet per minute in a nitrogen atmosphere resulted in a cured image of dots on the substrate which could not be smeared or rubbed off with water.

In this example, the trimethylolpropane triacrylate is a low molecular weight multifunctional ethylenically unsaturated material, as is the neopentyl glycol diacrylate. The N-vinyl-2-pyrrolidone is both a low molecular weight monofunctional ethylenically unsaturated material and a reactive synergist for the acrylate monomers. The alkyl benzoin ether is the potoinitiator; the ethyl alcohol, the polar organic solvent; and the 4-methoxyphenol is a stabilizer. The oil Blue A is both a dye colorant and an oil soluble salt.

As discussed previously, other multifunctional and monofunctional ethylenically unsaturated materials reactive synergists, photoinitiators, solvents, stabilizers, dyes and oil soluble salts may be used. Appropriate ones have been listed previously. Illustrative ones will also be found in the remaining examples which follow.

Example II

A jet printing ink was prepared by blending at room temperature the following ingredients (percent by weight composition)—

39.1% Trimethylolpropane Triacrylate
31.5% Vinyl Acetate
6.0% N-Vinyl-2-Pyrrolidone
3.0% α, α-Dimethoxybenzil
12.6% Ethyltriphenylphosphonium Acetate
6.0% Ethyl Alcohol (95%)
5.4% Methyl Alcohol
1.0% Orasol Black RL (manufactured by Ciba-Geigy; C.I. Solvent Black 29)

The viscosity of this recording ink is 11 cps at 20° C. and has a conductivity of 340 microhm/cm (resistivity of 2941 ohm-cm) and a surface tension of 35 dynes/cm. Applying the ink to a paper substrate as described in Example I and curing by exposure to the ultraviolet radiation source resulted in a hard, tack-free permanent image.

As in Example I, the trimethylolpropane triacrylate is a low molecular weight multifunctional ethylenically unsaturated material. The vinyl acetate is a monofunctional one as is the N-vinyl-2-pyrrolidone, which is also a reactive synergist. In this example, the photoinitiator is the dimethoxybenzil; two solvents were used--ethyl and methyl alcohol; there is no stabilizer; the C.I. Solvent Black 29 is the dye, and the ethyltriphenylphosphonium acetate is the oil soluble salt.

EXAMPLE III

An electron beam curable jet printing ink was prepared by blending the following ingredients (percent by weight composition)—

34.5% Pentaerythritol Triacrylate
31.5% Neopentyl Glycol Diacrylate
6.0% N-Vinyl-2-Pyrrolidone
3.0% Styrene
12.6% Ethyltriphenylphosphonium Acetate
6.0% Ethyl Alcohol (95%)
5.4% Methyl Alcohol
1.0% Orasol GN Blue (a phthalocyanine dye manufactured by Ciba-Geigy; C. I. Solvent Blue 67)

The viscosity of the recording ink is 14 cps at 20° C. and it has a conductivity of 330 microhm/cm (a resisitvity of 3030 ohm-cm) and a surface tension of 32 dynes/cm.

This ink was coated on a starch sized 20 lb. bond paper substrate with a No. 5 wire wound Meyer bar and cured by exposing the coating to 200 kilowatt beam of electrons for 0.1 seconds under a nitrogen atmosphere to give a hard, tack-free film, illustrating its applicability in a jet drop printing operation.

Both the pentaerythritol triacrylate and the neopentyl glycol diacrylate are multifunctional materials. As in Examples I and II, the N-vinyl-2-pyrrolidone serves as both a monofunctional material and a reactive synergist. In this example, however, styrene has been added as an additional monofunctional material. Again, as in Example II, a mixture of solvents was used, ethyltriphenylphosphonium acetate was added as an oil soluble salt, and no stabilizer was used.

In this example, no photoinitiator was added since a UV cure was not used. Rather, this example is for the purpose of illustrating how other radiation sources such as electron beam radiation may be used with the jet printing ink in the absence of a photoinitiator.

As can be seen from the foregoing examples, there is provided a superior jet drop printing process using the radiation curable inks of the present invention. While the examples and figure involve printing of the ink on a paper substrate, it should be apparent that other surfaces such as metal cans and cardboard and plastic packages can be printed in the same manner. In fact, the process and ink of the present invention offer even more advantages when a non-porous substrate is used since it is extremely difficult to print an aqueous or high solvent content ink onto such substrates.

While the jet drop printing process and ink composition of the present invention constitute a preferred embodiment of the invention, it is to be understood that the invention is not limited to this precise process or composition, and that changes may be made therein without departing from the scope of the invention which is defined in the appended claims.

What is claimed is:

1. A jet drop printing process utilizing a radiation curable jet printing ink, comprising:
    ejecting at high speed from an orifice or orifices a radiation curable ink composition comprising a mixture of
      (a) 5-80% of a low molecular weight multifunctional ethylenically unsaturated material which will polymerize and cure upon irradiation,
      (b) 0-90% of a low molecular weight monofunctional ethylenically unsaturated material for viscosity control, cured film flexibility and bond strength,
      (c) 0-15% of a reactive synergist to promote curing efficiency,
      (d) 0.2-10% of a solvent dye colorant which does not interfere with the curing efficiency,
      (e) 0.5-15% of an oil soluble salt to impart conductivity,
      (f) 0.2-20% of a photoinitiator, and
      (g) 0-30% of an organic polar solvent compatible with said mixture, said radiation curable ink having a viscosity of less than about 15 centipoise, a resistivity of approximately 50-5000 ohm-cm, and a surface tension of approximately 20-70 dynes/cm so that the stream of said ink composition issuing from said orifice or orifices breaks into droplets,
    passing said stream of droplets through a charge ring to thereby differentially charge said droplets,
    selectively deflecting said differentially charged droplets and directing them toward a paper substrate positioned so as to receive a portion of said differentially charged droplets,
    depositing at least a portion of said droplets in a pattern on said paper substrate, and
    passing said substrate having said pattern deposited thereon under a radiation source for a sufficient period of time to cure said radiation curable jet printing ink whereby there is formed on said substrate a pattern which is light absorptive at infrared wavelengths, smear resistant and waterproof.

2. The process of claim 1 wherein said radiation source is an ultraviolet light.

3. The process of claim 1 wherein said ink composition further includes a small amount of stabilizer to prevent premature curing of said mixture.

* * * * *